(12) United States Patent
Ivanovic et al.

(10) Patent No.: US 7,228,506 B2
(45) Date of Patent: Jun. 5, 2007

(54) SYSTEM AND METHOD FOR PROVIDING AN ICON OVERLAY TO INDICATE THAT PROCESSING IS OCCURRING

(75) Inventors: Relja Ivanovic, Redmond, WA (US); James Howard Wang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 631 days.

(21) Appl. No.: 10/670,753

(22) Filed: Sep. 25, 2003

(65) Prior Publication Data

US 2005/0071773 A1 Mar. 31, 2005

(51) Int. Cl.
*G06F 17/00* (2006.01)
(52) U.S. Cl. ............... 715/772; 715/853; 715/825; 715/810
(58) Field of Classification Search ........... 715/768, 715/772, 790, 825, 841, 844, 859, 794, 810, 715/823, 860, 853; 345/853
See application file for complete search history.

(56) References Cited

U.S. PATENT DOCUMENTS

| 5,301,348 A | * | 4/1994 | Jaaskelainen | 714/46 |
| 6,104,397 A | * | 8/2000 | Ryan et al. | 715/846 |
| 2002/0122077 A1 | * | 9/2002 | Doney et al. | 345/853 |
| 2003/0214538 A1 | * | 11/2003 | Farrington et al. | 345/854 |

FOREIGN PATENT DOCUMENTS

WO  WO 00/23874  *  4/2000

OTHER PUBLICATIONS

Cowart et al, "Special Edition Using Microsoft Windows XP Professional", Dec. 4, 2003, Chapter 4.*
Crawford, Sharon, "Windows 2000 Pro: The Missing Manual", Nov. 2000, Chapter 3.*
Gittins, D.T., et al., "An Icon-Driven End-User Interface to UNIX," *Int. J. Man-Machine Studies* 21(5):451-461, 1984.

* cited by examiner

*Primary Examiner*—Ba Huynh
*Assistant Examiner*—TuyetLien Tran
(74) *Attorney, Agent, or Firm*—Christensen O'Connor Johnson Kindness PLLC (57) ABSTRACT

An icon overlay for indicating that processing is occurring. When a user makes a selection to expand a node (e.g., a node in a tree view), the processing of the enumeration may take some time. To provide an indication to a user that processing is occurring, an icon overlay is animated over the expanding node's icon. In one embodiment, the overlay is a magnifying glass that is animated to move between three different positions that are changed on a timer. Once the processing is complete, the icon overlay is removed, and the sub-items for the node are inserted into the tree. By using an overlay, the view of the expanding node's icon is preserved as an important part of identifying its type, e.g., network domain, network computer, file system folder, etc. Multiple icon overlays may be provided for multiple expanding nodes at the same time.

31 Claims, 14 Drawing Sheets

SYSTEM AND METHOD FOR PROVIDING AN ICON OVERLAY TO INDICATE THAT PROCESSING IS OCCURRING

FIELD OF THE INVENTION

The embodiment of the present invention relates to systems and methods for providing an indication in a user interface that processing is occurring, and more particularly, to using an icon overlay to indicate when processing of an expansion of a node is occurring.

BACKGROUND OF THE INVENTION

In certain known file management programs (e.g., Windows® Explorer), when users click on a node in the folder bar (also known as a tree view or name space control), the expansion is asynchronous. In other words, users can continue using the control inside the bar without having to wait for the enumeration to finish. In certain other known programs (e.g., Windows® 2000), the expansion is not asynchronous, in that once a user clicks on a node in the folder bar, the user is prevented from using the control inside the bar until the enumeration has finished. In other words, while the enumeration is being completed, the user is blocked from being able to use anything in the search window until the enumeration is finished and all of the folder sub-items are inserted into the tree. In this system, while the enumeration is being completed, there is no indication that the system is performing any action (aside from, in some cases, a plus-sign element disappearing after being clicked on to start the enumeration). The lack of feedback to the user can be problematic when the enumeration is taking a long time (e.g., when the user tries to expand a network domain node in the tree) in that the user is forced to remain in a state of uncertainty as to whether the system is progressing or not.

The embodiment of the present invention is directed to providing a system and method that overcome the foregoing and other disadvantages. More specifically, the embodiment of the present invention provides feedback to a user that processing is occurring.

SUMMARY OF THE INVENTION

A system and method for providing feedback to a user by providing a processing indicator in a user interface. In accordance with one aspect of the invention, the processing indicator represents to a user that the system is processing the expansion of a node in a tree view. Once the processing is completed, the processing indicator is removed, and the node is expanded with the respective sub-items being inserted into the tree.

In accordance with another aspect of the invention, the processing indicator is moved between different positions at selected intervals according to a timing component. By making the processing indicator appear to be moving between a set of selected positions (e.g., in a circle), the user is provided with an indication that the system is continuing to process the expansion of the node.

In accordance with another aspect of the invention, in one embodiment, the processing indicator is provided in the form of a magnifying glass icon overlay. As noted above, the magnifying glass icon overlay may be provided in different positions that are changed on a timer (e.g., in one embodiment the overlay is moved between three different positions), so as to provide a visual representation of the magnifying glass moving in a circle. The circular motion of the magnifying glass indicates to a user that the system is continuing to process the expansion of the node.

In accordance with another aspect of the invention, multiple processing indicators may be provided when there are multiple nodes being expanded at the same time. In other words, in one embodiment, while an icon overlay is being provided for a first node, if a user selects a second node to be expanded while the first node is still being processed, a second icon overlay will be provided for the second node.

It will be appreciated that the embodiment of the present invention provides feedback to a user that the system is continuing to process an expansion of a node. Furthermore, the specific use of an icon overlay allows the user to continue to view the icon that is associated with the node, which can be an important part of identifying its type, e.g., network domain, network computer, folder, etc.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The embodiment of the present invention is directed to a system and method for providing an icon overlay to indicate that processing is occurring. As will be described in more detail below, in accordance with one embodiment of the present invention, an icon overlay provides feedback to a user that the system is processing an expansion of a node (e.g., completing an enumeration for a node that is being expanded). In one implementation, the icon overlay is provided in the form of a magnifying glass which is moved between three different positions so as to appear to be moving in a circle, thus providing an indication to the user that system progress is occurring while the overlay continues to be in motion.

Figure 1:
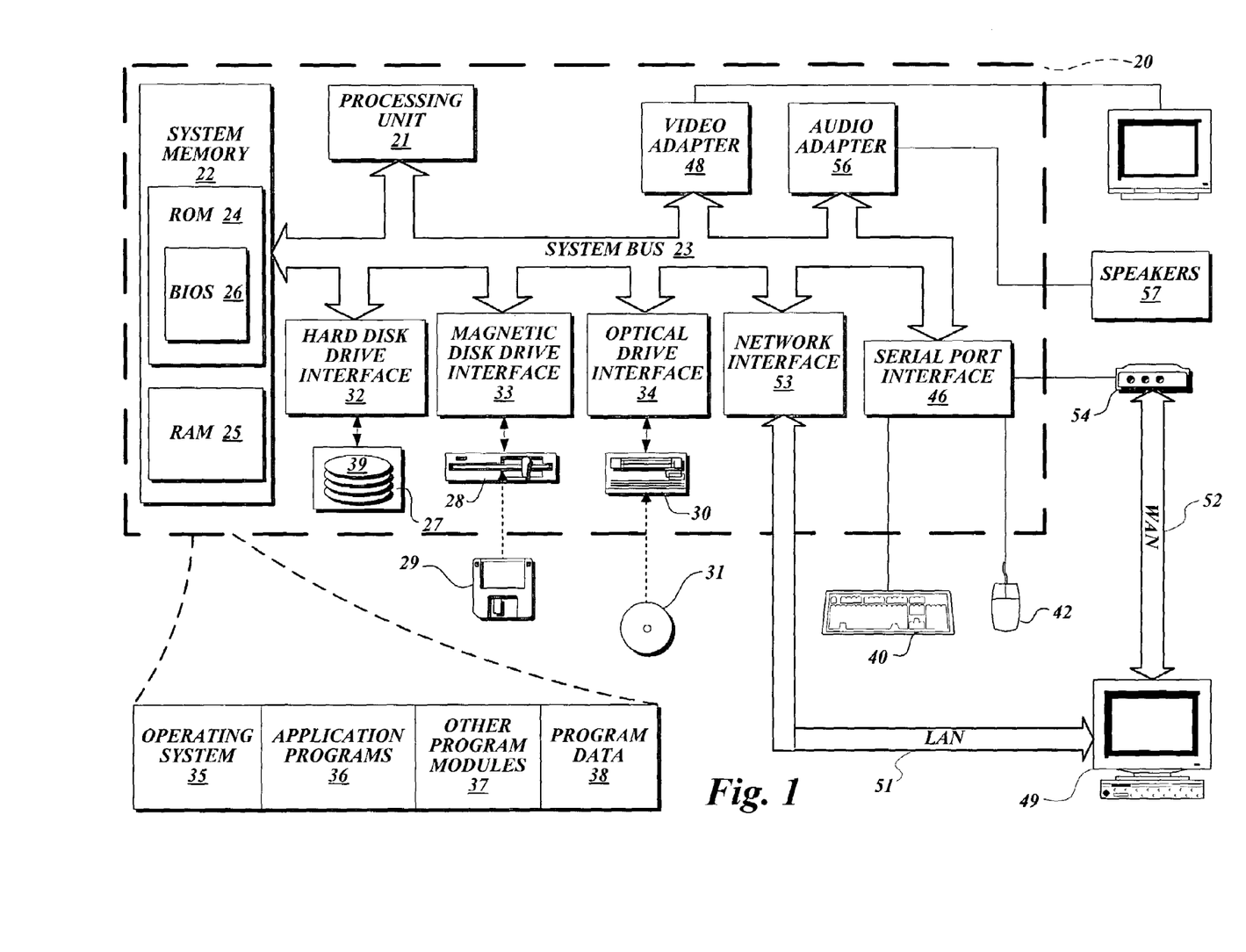
FIG. 1 is a block diagram of a general purpose computer system suitable for implementing an embodiment of the present invention.

FIG. 1 and the following discussion are intended to provide a brief, general description of a suitable computing environment in which the embodiment of the present invention may be implemented. Although not required, the embodiment of the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the embodiment of the invention may be practiced with other computer system configurations, including hand-held devices, multiprocessor systems, microprocessor-based or programmable consumer electronics, network PCs, minicomputers, mainframe computers, and the like. The embodiment of the invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the embodiment of the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet. The LAN and WAN may be wired, wireless or a combination thereof.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

Figure 2:
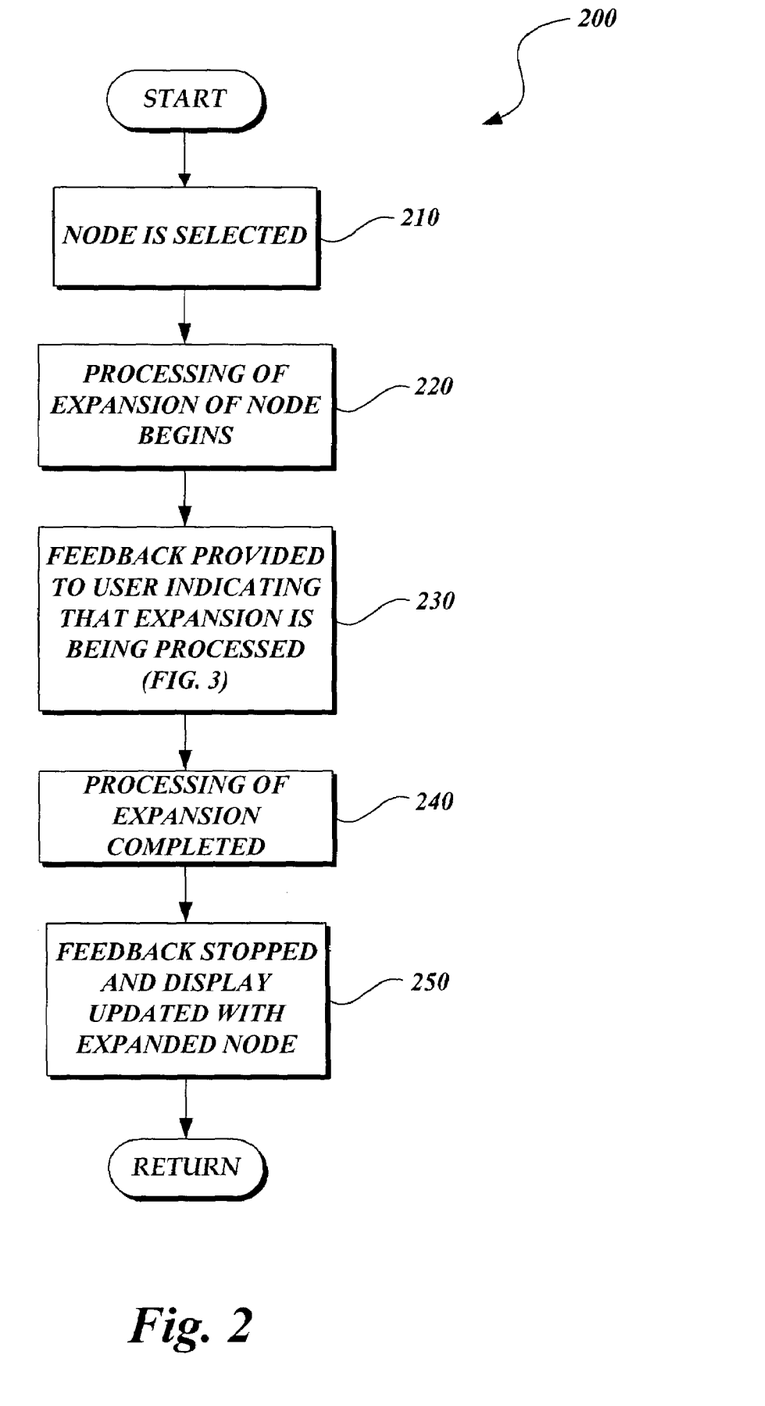
FIG. 2 is a flow diagram illustrative of a general routine for expanding a node.

FIG. 2 is a flow diagram of a general routine 200 for expanding a node. At a block 210, the user clicks on a node. At a block 220, the processing of the expansion of the node begins. As will be discussed in more detail below, in one embodiment, the node may consist of any type of node element, such as a file system folder, a network computer, a network domain, etc. Furthermore, the processing of the expansion of the node may include completing an enumeration, and then inserting all of the sub-items from the enumeration into the tree.

At a block 230, feedback is provided to the user indicating that the expansion is being processed. One embodiment of the feedback is described in more detail below with reference to FIG. 3. At a block 240, the processing of the expansion is completed. At a block 250, the feedback is stopped and the display is updated with the expanded node. As noted above, in one embodiment, the expansion of the node includes inserting all of the node sub-items into the tree.

Figure 3:
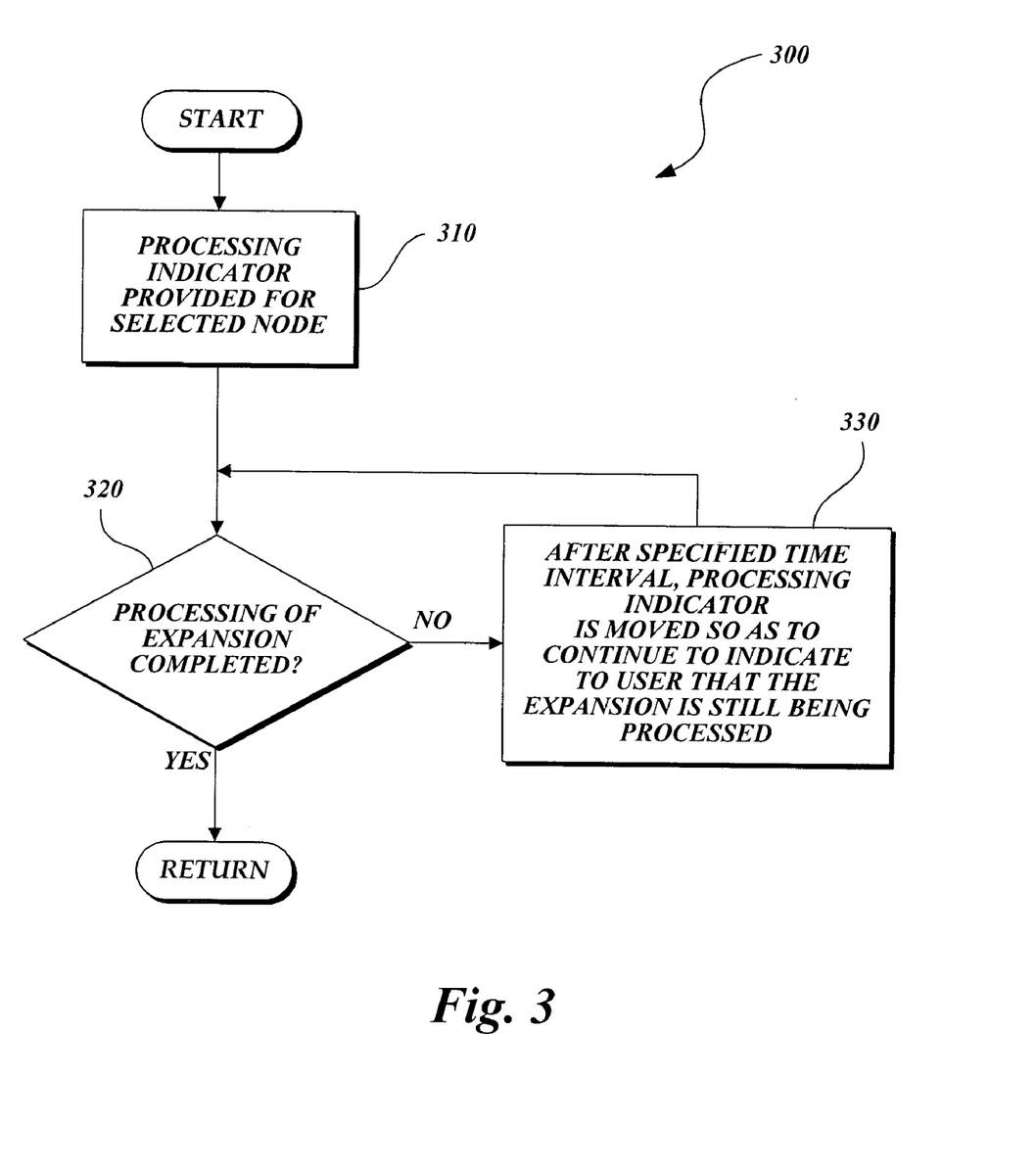
FIG. 3 is a flow diagram illustrative of a general routine for providing feedback to a user to indicate that the processing of the expansion of the node is progressing.

FIG. 3 is flow diagram illustrative of a general routine 300 for providing feedback to a user to indicate that the processing of the expansion of the node is progressing. At a block 310, a processing indicator is provided on the display for a selected node. As will be discussed in more detail below, in one embodiment, the processing indicator may consist of an icon overlay. At a decision block 320, a determination is made as to whether the processing of the expansion has been completed. If the processing of the expansion has been completed, then the routine ends. If the processing of the expansion has not yet been completed, then the routine continues to a block 330.

At block 330, after a specified time interval that is controlled by a timer, the processing indicator is moved so as to provide an indication to the user that the expansion is still being processed. From block 330, the routine returns to decision block 320, to again monitor whether the expansion has been completed. As will be discussed in more detail below, in an embodiment where the processing indicator is an icon overlay, the overlay may be moved in a circular pattern.

Figure 4:
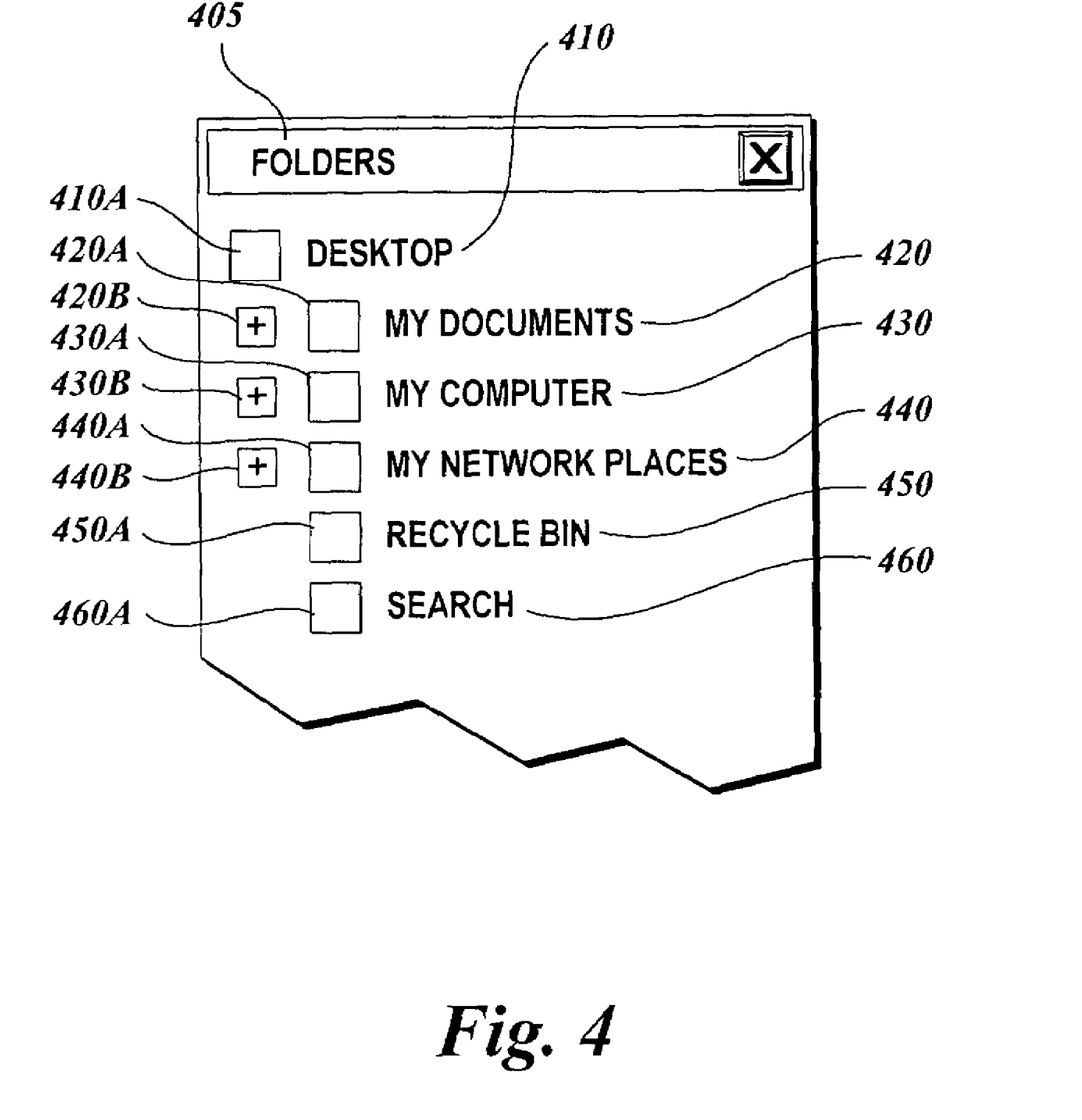
FIG. 4 is a diagram of a screen display with a series of nodes that may be selected for expansion by a user.

FIG. 4 is a diagram of a screen display with a series of nodes that may be selected for expansion by a user. The screen display includes a folder bar 405, a Desktop node 410, a My Documents node 420, a My Computer node 430, a My Network Places node 440, a Recycle Bin node 450 and a Search node 460. The Desktop node 410 is a first level node, and includes an associated icon 410a. It will be appreciated that as illustrated in FIG. 4, and in accordance with the following description, the icons for the various nodes, such as icon 410a for the Desktop node 410, are illustrated as a blank square. It will be appreciated that while this representation is provided for simplification of the illustration, the icon squares are intended to be representative of any type of icon, such as a folder icon, a computer icon, or other types of icons that are known in the art.

As noted above, the Desktop node 410 is a first level node. The My Documents node 420, My Computer node 430, My Network Places node 440, Recycle Bin node 450, and Search node 460 are all second level sub-nodes below the Desktop node 410. Each of the sub-nodes has an associated icon, including icons 420a-460a, respectively. The My Documents node 420, My Computer node 430, and My Networks Places node 440 each also have a plus-sign element 420b, 430b, and 440b, respectively. The plus-sign elements 420b, 430b, and 440b indicate that the respective nodes may be expanded by a user clicking on the plus-sign elements.

Figure 5:
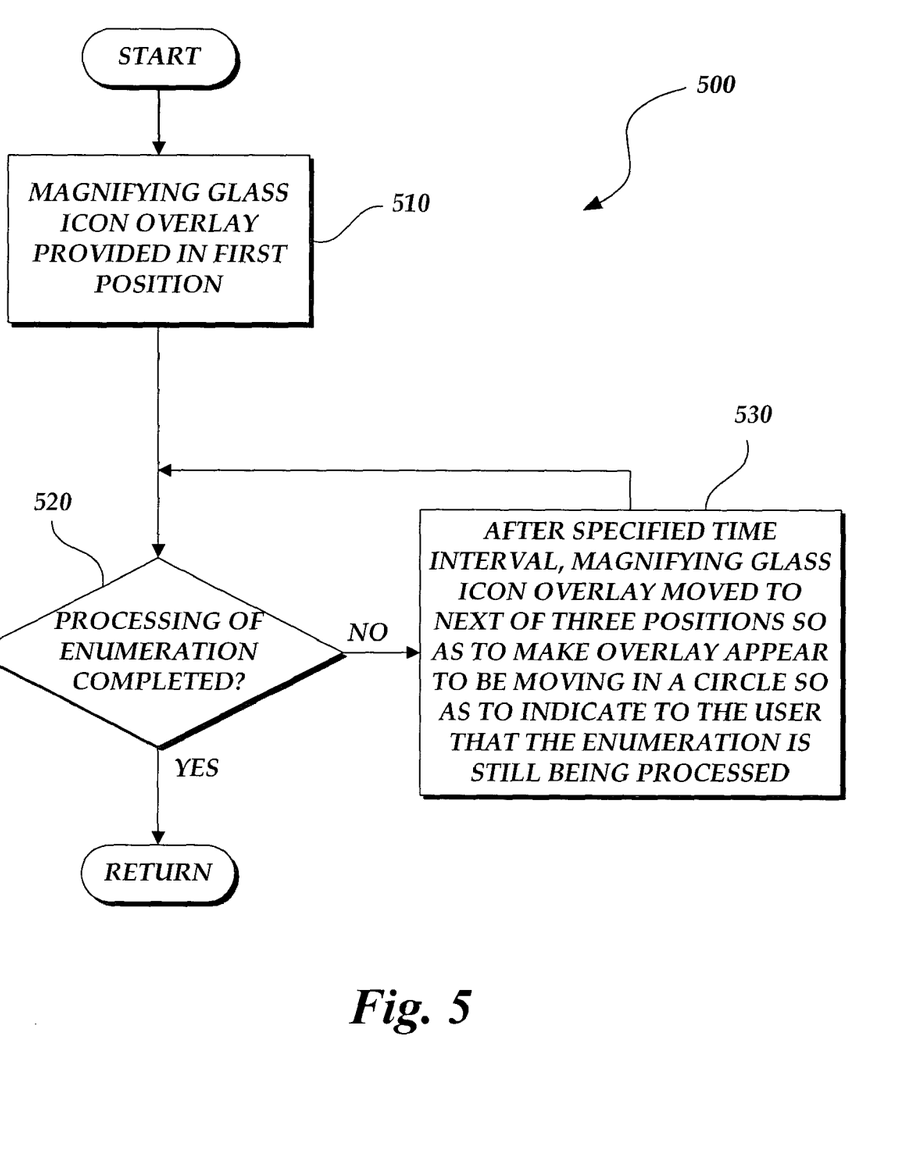
FIG. 5 is a flow diagram of a routine for providing a magnifying glass icon overlay for a node.

FIG. 5 is a flow diagram of a routine 500 for providing a magnifying glass icon overlay that moves while an enumeration for expanding a node is being processed. In other words, once one of the plus-sign elements 420b-440b of FIG. 4 are clicked on, the process for expanding the respective node begins, and a magnifying glass icon overlay is provided for the respective icon of the selected node. As shown in FIG. 5, at a block 510, the magnifying glass icon overlay is provided in a first position for a selected node. At a decision block 520, a determination is made as to whether the processing of the enumeration is completed. If the processing of the enumeration is completed, then the routine ends. If the processing of the enumeration is not yet completed, then the routine continues to a block 530.

At block 530, the magnifying glass icon overlay is moved to the next of three positions so as to make the overlay appear to be moving in a circle. The circular motion is intended to indicate to the user that the enumeration is still being processed. More specifically, in one embodiment, the magnifying glass icon overlay is moved between three different positions that are changed on a timer. Between each of the movements of the magnifying glass icon overlay, the routine returns to decision block 520 to continue to monitor for whether the processing of the enumeration has been completed.

Figure 6:
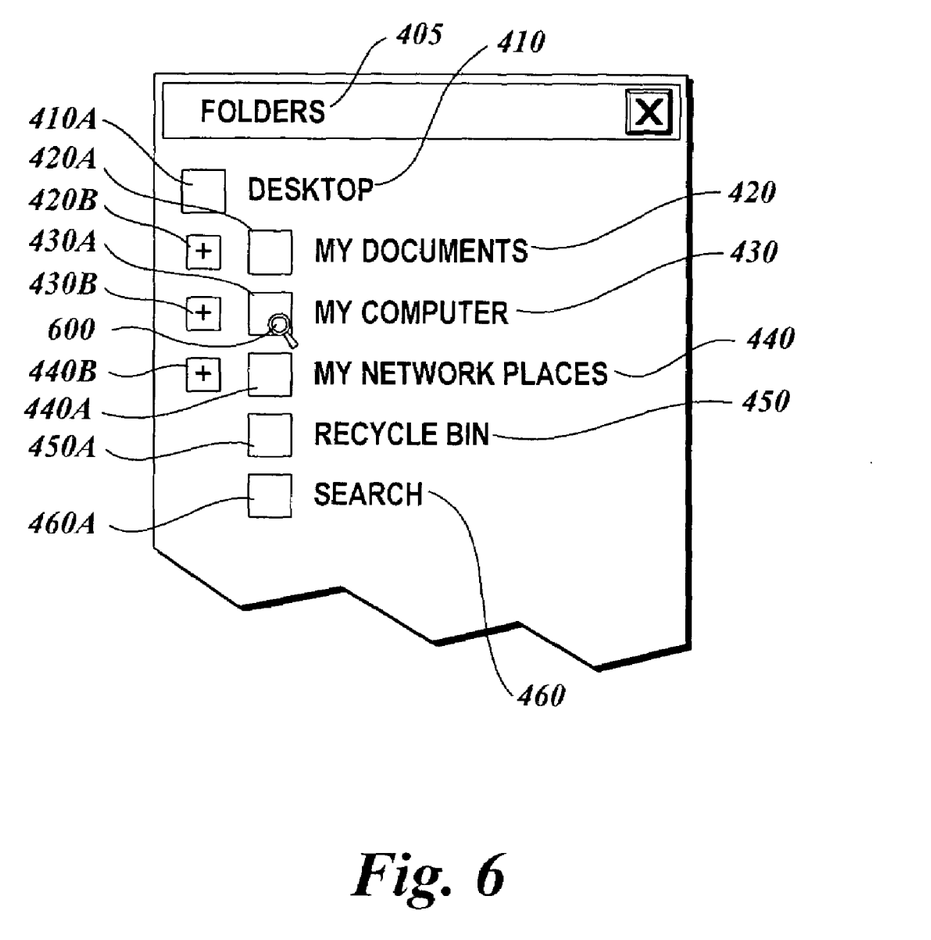
FIG. 6 is a diagram of a screen display showing the magnifying glass icon overlay of the routine of FIG. 5.

FIG. 6 is a diagram of a screen display illustrating the magnifying glass icon overlay of the routine of FIG. 5 as applied to the screen display of FIG. 4. As shown in FIG. 6, the magnifying glass icon overlay 600 is provided over the icon 430a of the My Computer node 430. In other words, after a user has clicked on the plus-sign element 430b, the process for expanding the My Computer node 430 begins, and the magnifying glass icon overlay 600 is placed in a first position over the icon 430a.

Figure 7A:
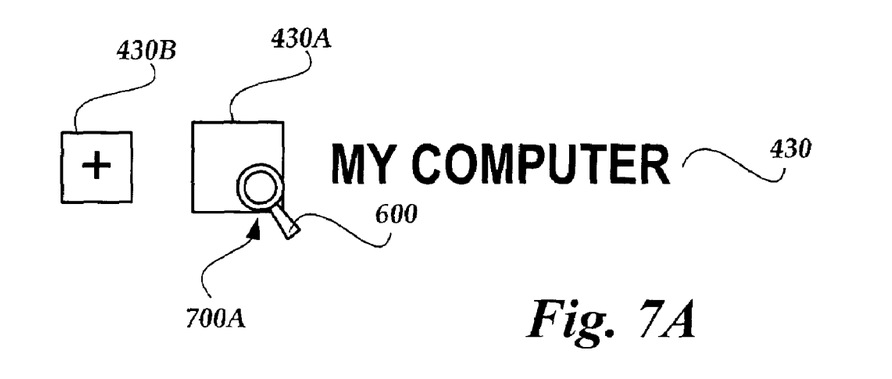
FIGS. 7A-7C are diagrams of a portion of the screen display of FIG. 6 showing the movement of the magnifying glass icon overlay through three positions.
Figure 7B:
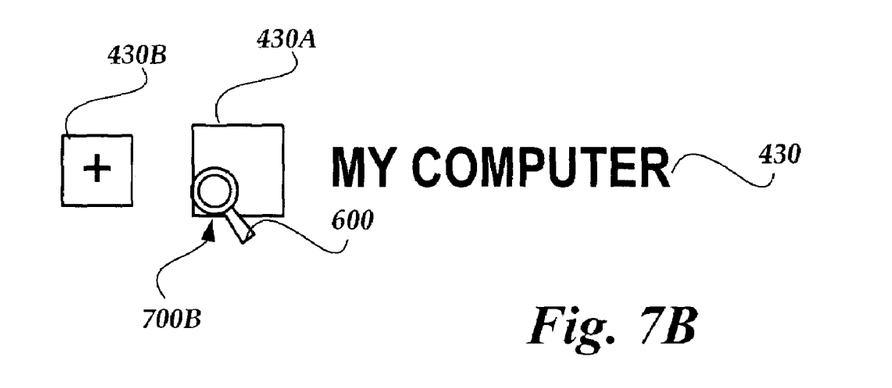
Figure 7C:
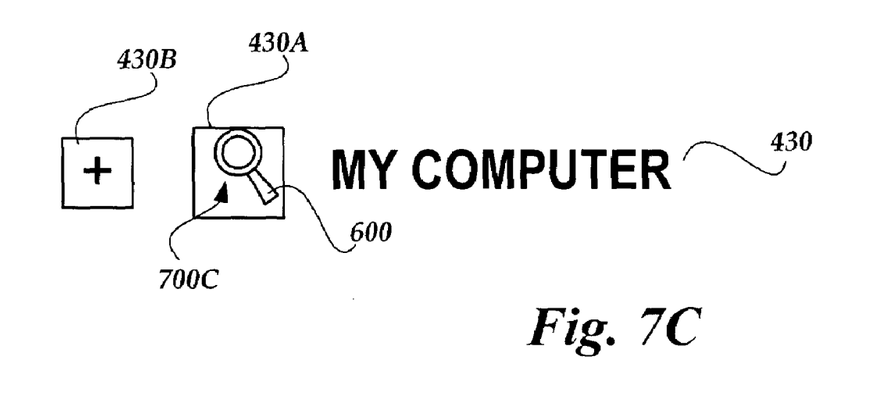

FIGS. 7A-7C are diagrams of the My Computer node 430 and icon 430a of FIG. 6 showing the movement of the magnifying glass icon overlay through three positions. As shown in FIG. 7A, the magnifying glass icon overlay 600 is provided in a first position 700a. As shown in FIG. 7B, the magnifying glass icon overlay 600 is provided in a second position 700b. As shown in FIG. 7C, the magnifying glass icon overlay 600 is provided in a third position 700c.

As noted above, after the magnifying glass icon overlay 600 reaches the third position 700c, after the next time interval, the magnifying glass icon overlay 600 is returned to the first position 700a. Thus, as the magnifying glass icon overlay 600 is repeatedly moved between the three positions 700a, 700b, and 700c, which are changed on a timer, the overlay is made to appear to be moving in a circular pattern. This circular pattern is intended to provide an indication to a user that processing is continuing to occur with regard to the expansion of the node. This provides feedback to a user that processing is occurring, which is especially useful when the processing of the expansion is taking a significant amount of time. It will be appreciated that by providing feedback to a user in the form of an animated icon overlay, the view of the expanding node's icon is preserved as an important part of identifying its type, e.g., network domain, network computer, file system folder, etc.

Figure 8:
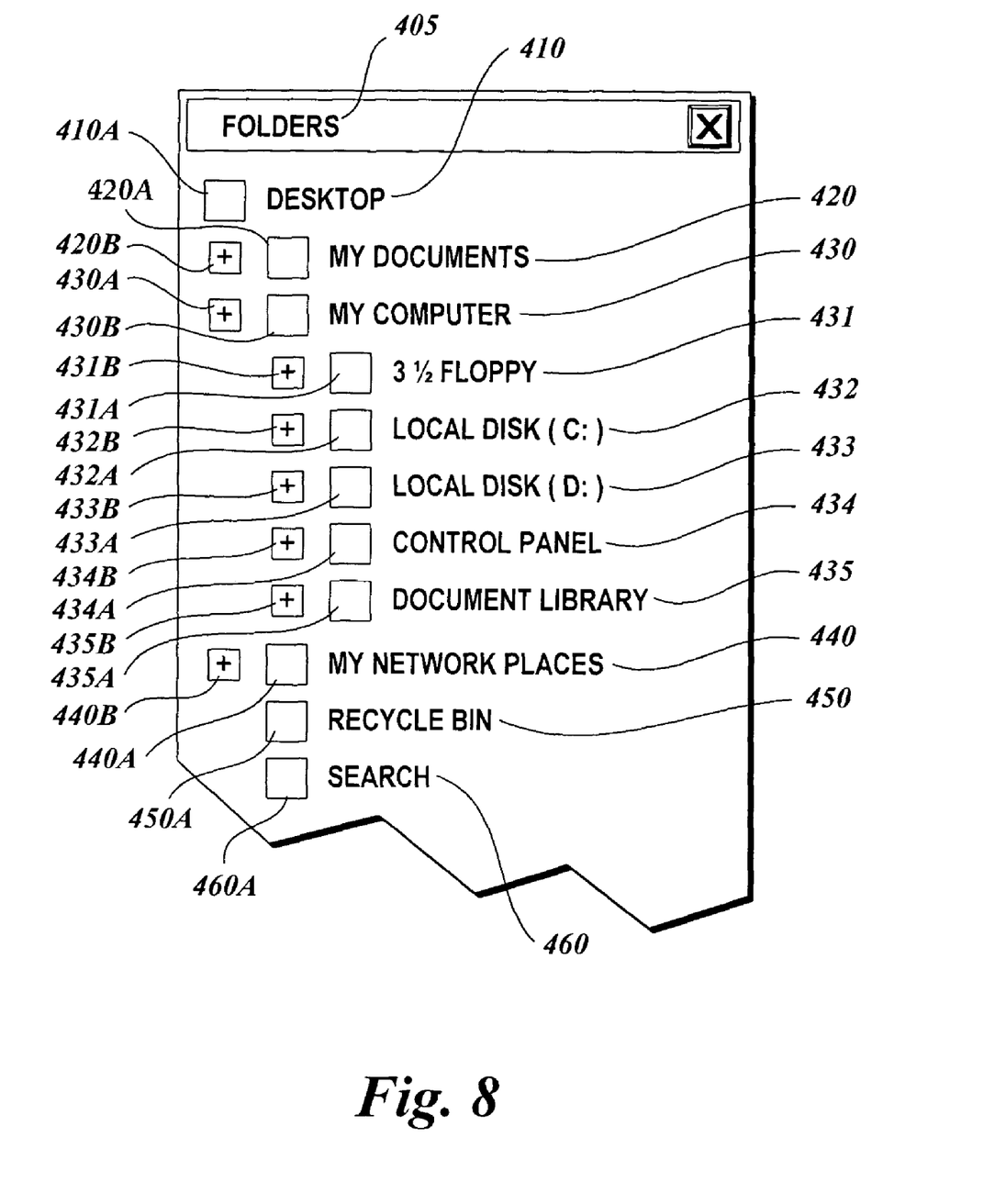
FIG. 8 is a diagram of a screen display showing an expanded node.

FIG. 8 is a diagram of a screen display showing the expansion of the My Computer node 430 once the enumeration has been completed. As illustrated in FIG. 8, the My Computer node 430 has been expanded to include a series of third level sub-nodes, including a 3½ Floppy node 431, a Local Disk (C:) node 432, a Local Disk (D:) node 433, a Control Panel node 434, and a Document Library node 435. Each of the nodes 431-435 includes an associated icon 431a-435a, respectively. Each of the nodes 431-435 also includes a plus-sign element 431b-435b, respectively. The My Network Places node 440, Recycle Bin node 450, and Search node 460 are located at the bottom of the screen display, below the My Computer node 430 which has been expanded with the sub-nodes 431-435.

Figure 9A:
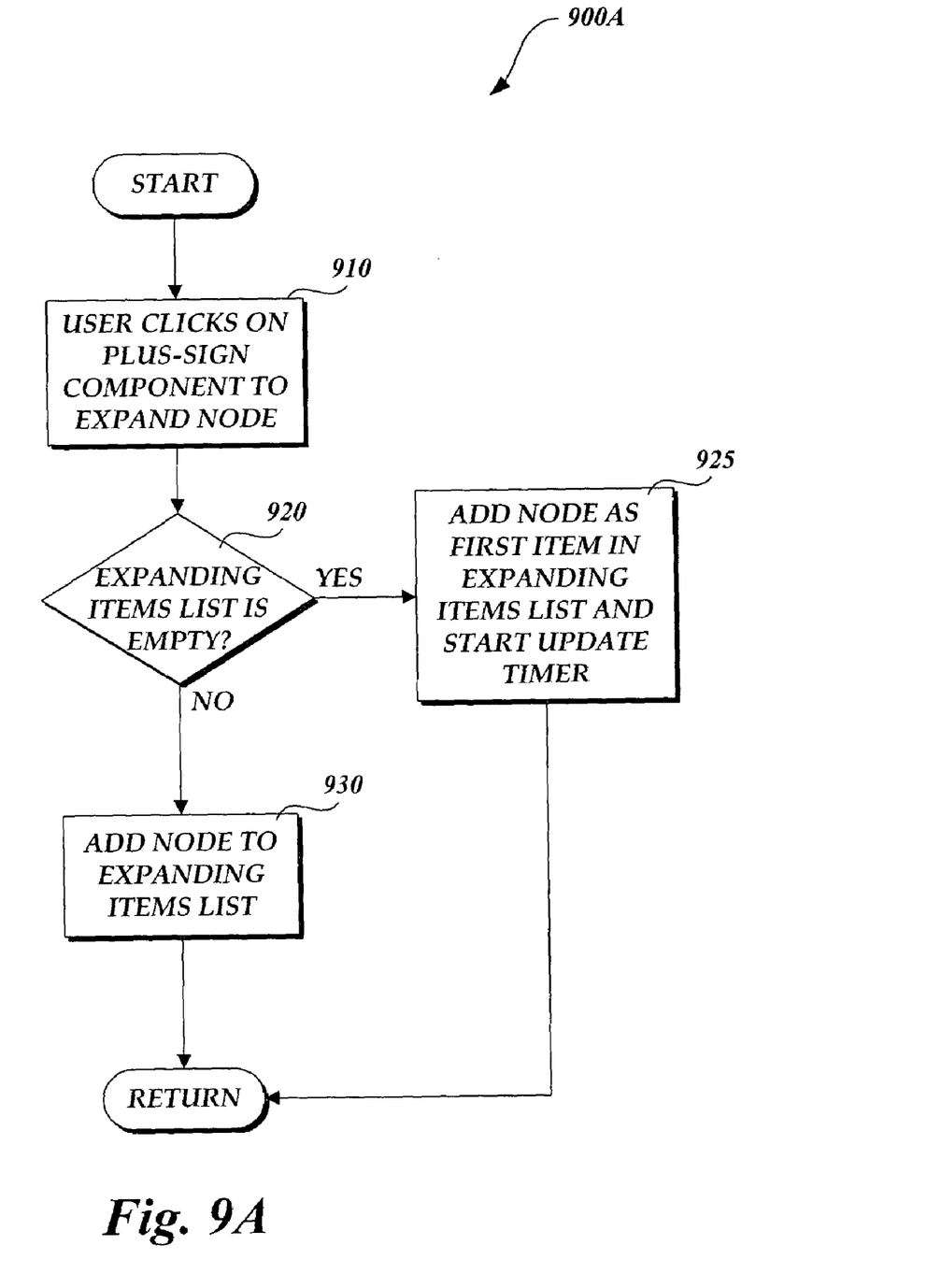
FIGS. 9A-9C are flow diagrams illustrative of a series of routines in which a user may click on multiple nodes for which the expansions are being processed simultaneously.
Figure 9B:
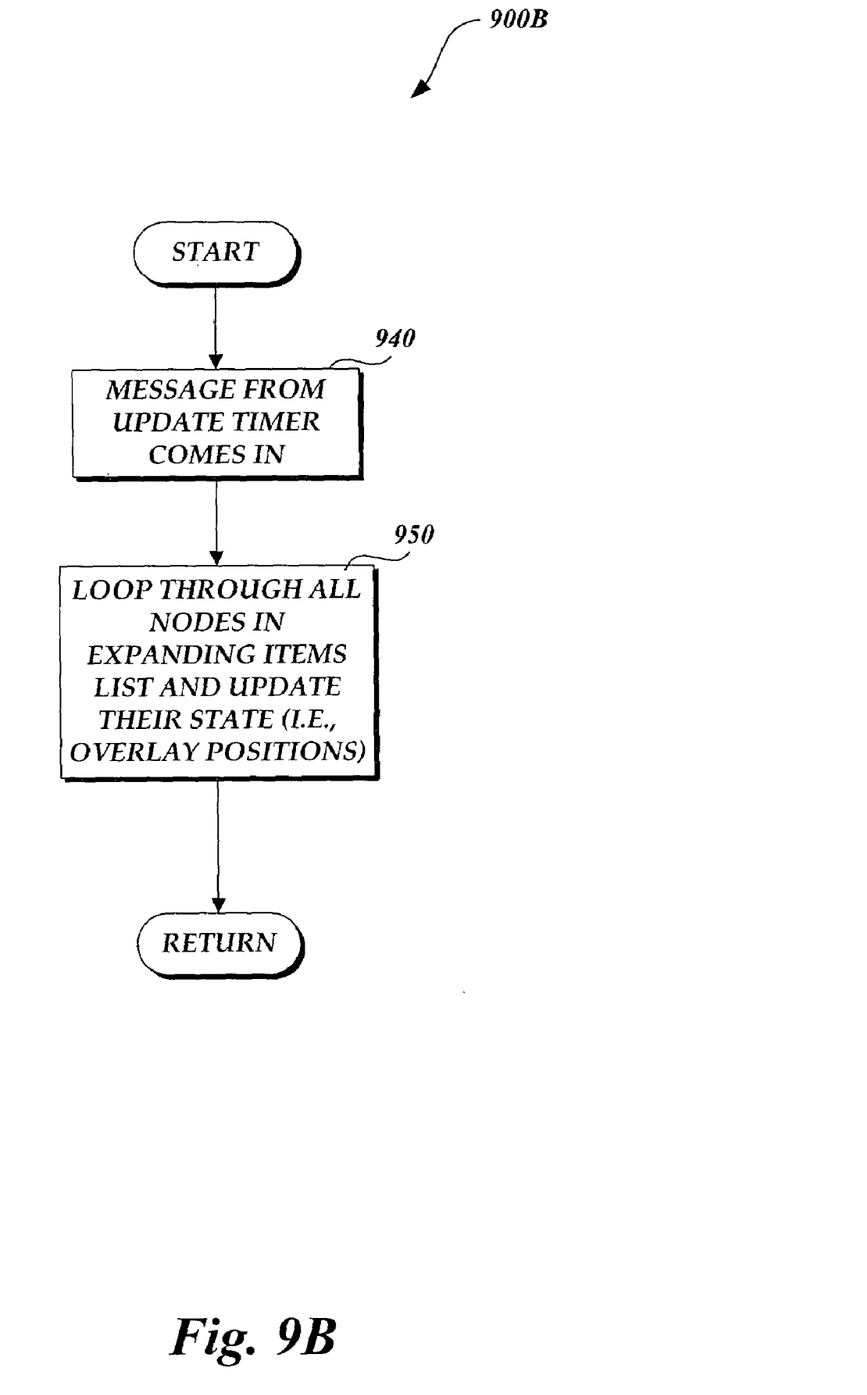
Figure 9C:
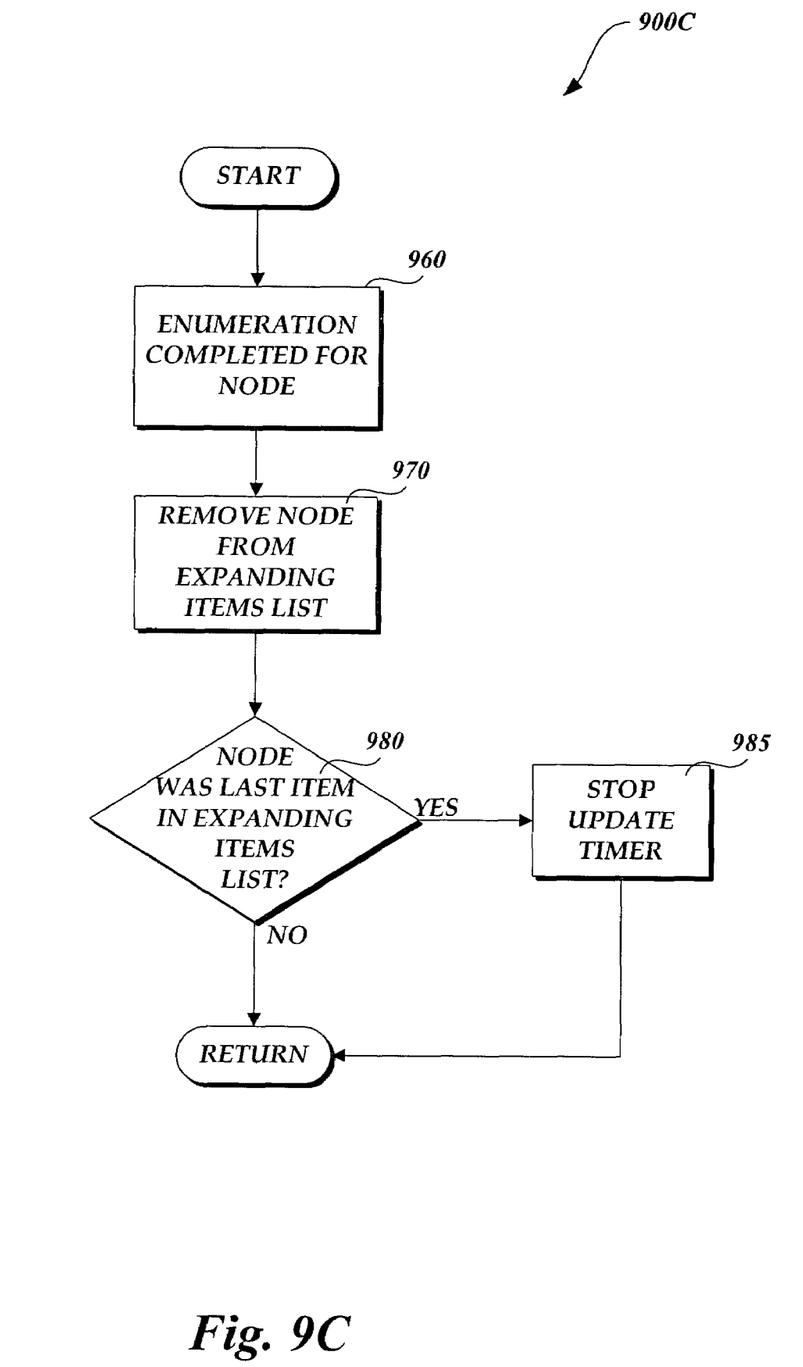

FIGS. 9A-9C are flow diagrams illustrative of a series of routines 900A-900C in which a user may click on multiple nodes to cause the enumerations to be processed simultaneously. As illustrated in FIG. 9A, at a block 910, a user clicks on a plus-sign component to expand a node. At a decision block 920, a determination is made as to whether the expanding items list is currently empty. If the expanding items list is currently empty, then the routine continues to a block 925, where the node is added as the first item in the expanding items list and the update timer is started. If the expanding items list already has other nodes being expanded, then the routine continues to a block 930, where the node is added to the expanding items list.

As shown in FIG. 9B, at a block 940, the update timer message is received. At a block 950, the routine loops through all of the nodes in the expanding items list and updates their states (i.e., overlay positions). It will be appreciated that if the overlays (e.g., magnifying glass icon overlays) are not started in the same phase positions for the various nodes, then the overlays will continue to be in different phase positions throughout the timing cycle with respect to one another, as will be described in more detail below with reference to FIG. 10.

As shown in FIG. 9C, at a block 960 an enumeration is completed for a node. At a block 970, the node is removed from the expanding items list. At a decision block 980, a determination is made as to whether the node was the last item in the expanding items list. If the node was the last item in the expanding items list, then the routine continues to a block 985 where the update timer is stopped. If the node was not the last item in the expanding items list, then the routine returns. It will be appreciated that once the enumeration is completed for a node, if there are any remaining nodes in the expanding items list, the process will continue for those nodes which will thus continue to have icon overlays.

Figure 10:
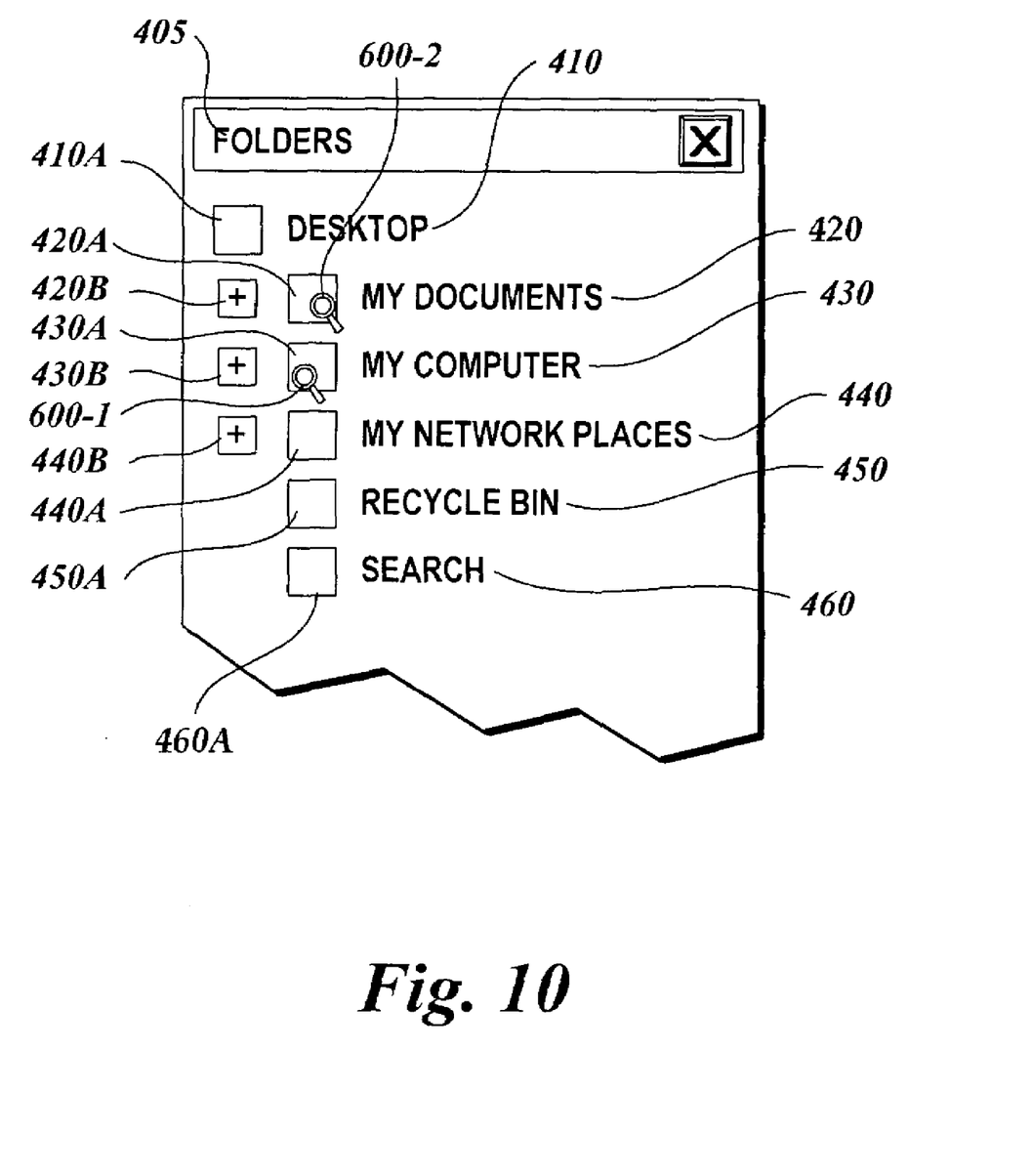
FIG. 10 is a diagram of a screen display in which two magnifying glass icon overlays are provided for two nodes in accordance with the routines of FIGS. 9A-9C.

FIG. 10 is a diagram of a screen display in which two magnifying glass icon overlays are provided for two nodes, in accordance with the routine of FIGS. 9A-9C. As shown in FIG. 10, a first icon overlay 600-1 is provided for the icon 430*a* for the My Computer node 430, while a second icon overlay 600-2 is provided for the icon 420*a* for the My Documents node 420. In this particular example, after a user has selected the first plus-sign component 430*b* to expand the My Computer node 430, while the expansion of the My Computer node 430 is still being processed and the icon overlay 600-1 is still being animated in a circle over the icon 430*a*, the user selects the plus-sign component 420*b* to expand the My Documents node 420. Once the user selects the plus-sign component 420*b*, the second icon overlay 600-2 appears over the icon 420*a* for the My Documents node 420, and continues to be animated in a circle until the expansion of the My Documents node 420 is completed. It should be noted that the first magnifying glass icon overlay 600-1 is in a different phase position relative to the second magnifying glass icon overlay 600-2. This has occurred because the second magnifying glass icon overlay 600-2 was started in a different phase position with respect to the first magnifying glass icon overlay 600-1. As noted above, both of the magnifying glass icon overlays 600-1 and 600-2 are moved between the respective three different positions that are changed on a timer as illustrated above with respect to FIGS. 7A-7C.

Figure 11:
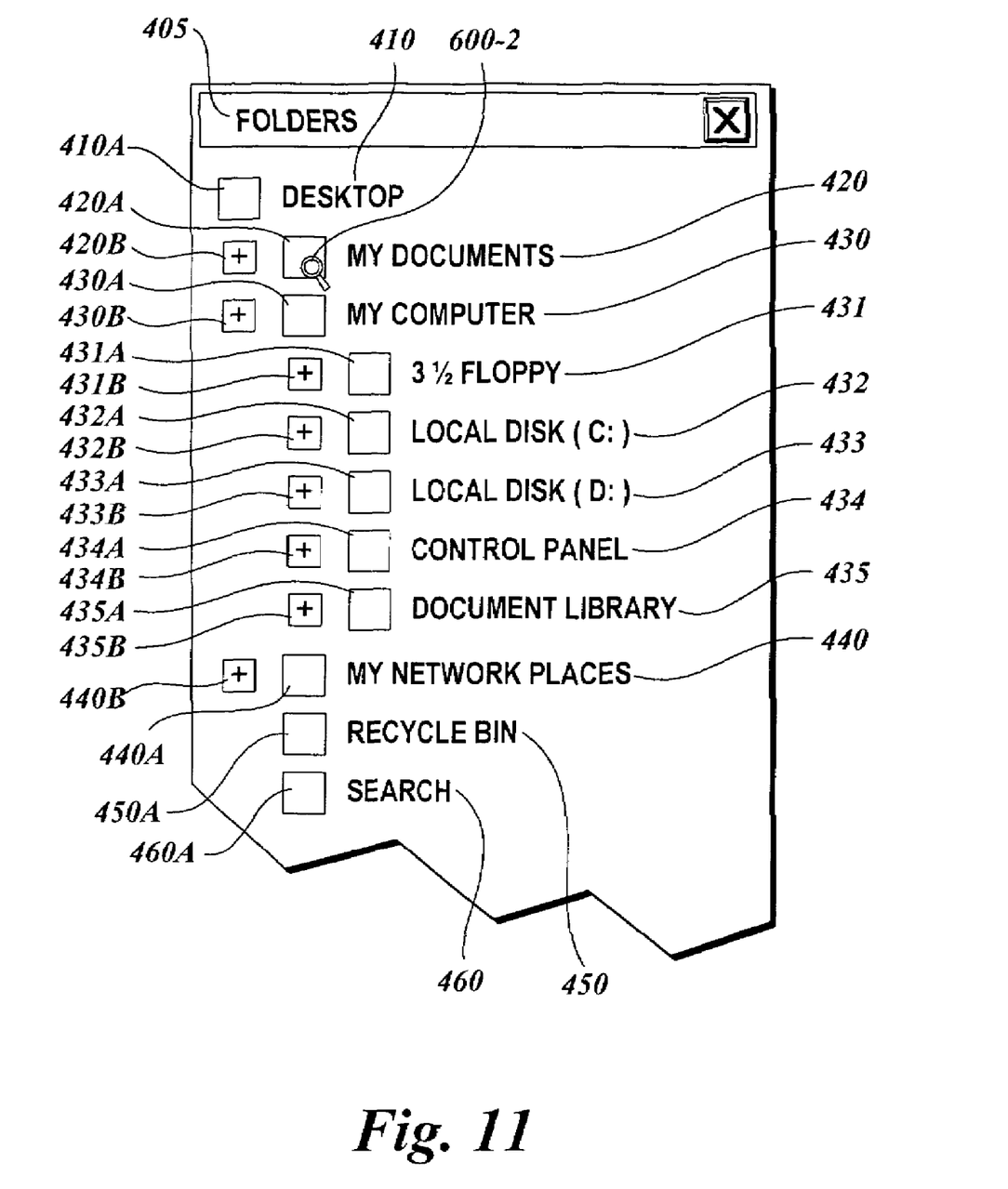
FIG. 11 is a diagram of a screen display in which the expansion of the first node of FIG. 10 has been completed while the processing of the expansion of the second node is continuing.

FIG. 11 is a diagram of a screen display in which the expansion of the My Computer node 430 of FIG. 10 has been completed, but the processing of the expansion of the My Documents node 420 is continuing. As shown in FIG. 11, the expanded My Computer node 430 includes the series of sub-items that have been inserted into the tree. More specifically, below the My Computer node 430 are shown the 3½ Floppy node 431, the Local Disk (C:) node 432, the Local Disk (D:) node 433, the Control Panel node 434, and the Document Library node 435. All of the nodes 431-435 have associated icons 431*a*-435*a*, respectively. All of the nodes 431-435 also have associated plus-sign elements 431*b*-435*b*, respectively, which may be selected by a user to further expand the nodes 431-435. The processing of the expansion of the My Documents node 420 is shown to be continuing, as the second icon overlay 600-2 is shown to still be present over the associated icon 420*a*. As described above, the second magnifying glass icon overlay 600-2 continues to be animated in three different positions that are changed on the timer as long as the processing of the expansion of the My Documents node 420 continues.

Figure 12:
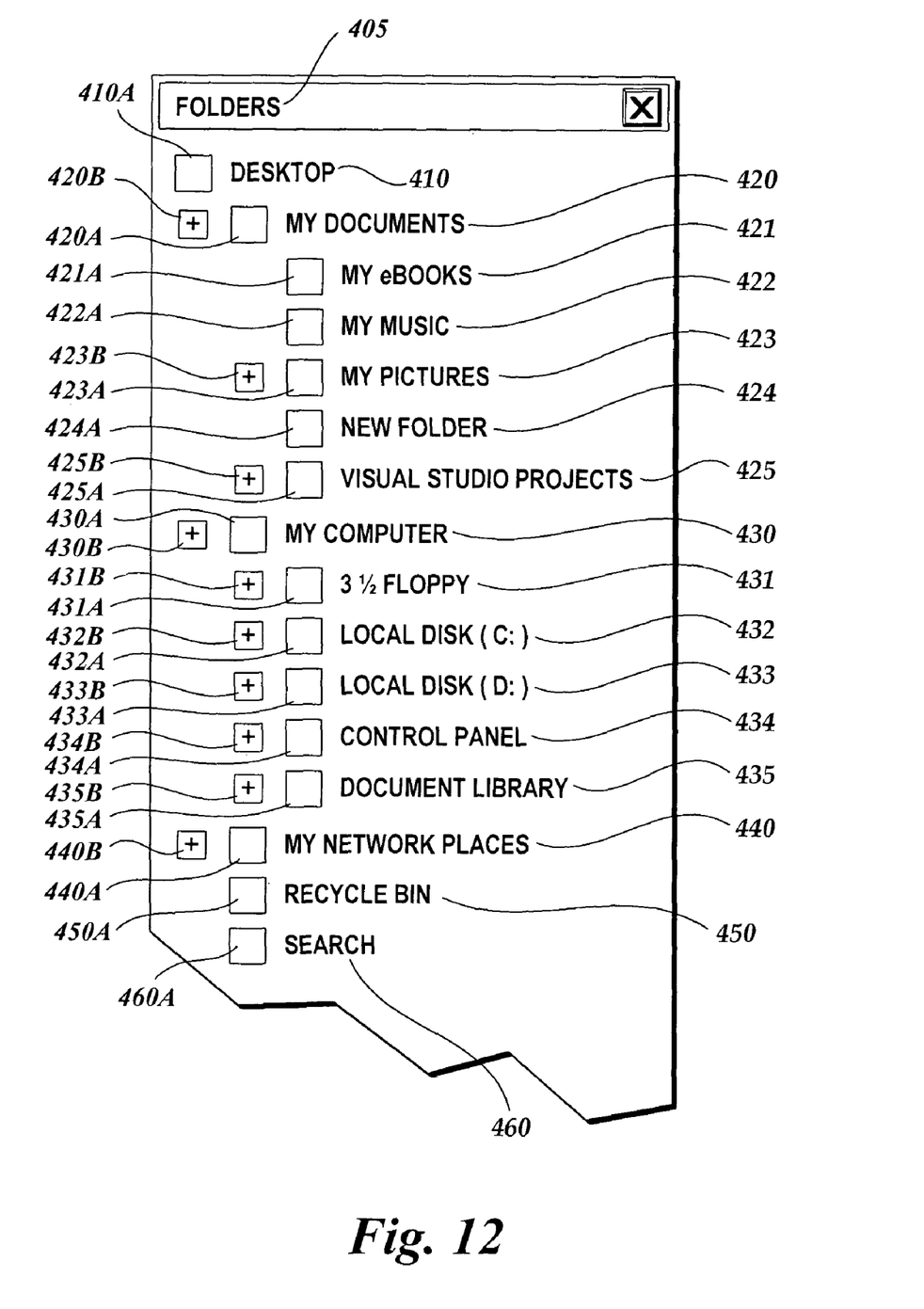
FIG. 12 is a screen display in which both of the expansions of both of the selected nodes of FIG. 10 have been completed.

FIG. 12 is a screen display in which the processing of the expansion of the My Documents node 420 of FIG. 11 has been completed. As shown in FIG. 12, because no expansions are still being processed, no magnifying glass icon overlays are present. Instead, because the expansion of the My Documents node 420 has been completed, the expanded node is shown to include a series of sub-items in the tree, including a My eBooks node 421, a My Music node 422, a My Pictures node 423, a New Folder node 424, and a Visual Studio Projects node 425. All of the nodes 421-425 have associated icons 421*a*-425*a*, respectively. The nodes 423 and 425 also have associated plus-sign elements 423*b* and 425*b*, respectively, which may be selected by a user to further expand the nodes 423 and 425.

While the preferred embodiment of the invention has been illustrated and described, it will be appreciated that various changes can be made therein without departing from the spirit and scope of the invention.

The embodiments of the invention in that an exclusive property or privilege is claimed are defined as follows:

1. In a computer system with a display on which icons that are associated with nodes are provided and in which a user may select a node for expansion, a method for providing an indication to the user that the processing of the expansion of a node is occurring, the, method comprising:

providing an icon overlay over an icon representing a node once a node is selected by the user for expansion to provide an indication to the user that the node is selected for expansion, wherein the user selects the node for expansion by selecting a plus-sign element that is associated with the icon representing the node and wherein the node is represented as part of a tree view on the display; and moving the icon overlay between a plurality of positions at selected time intervals so as to provide an indication to the user that the processing of the expansion of the node is occurring.

2. The method of claim 1, wherein a timer controls the moving of the icon overlay between the plurality of positions.

3. The method of claim 1, wherein the processing of the expansion of the node comprises completing an enumeration that includes sub-items that are to be inserted into the tree view below the node.

4. The method of claim 1, wherein the node is a folder, a computer, or a network domain.

5. The method of claim 1, wherein a second icon overlay is provided over a second icon representing a second node once an associated second node is selected for expansion by a user to indicate to the user that the expansion of the second node is occurring while the expansion of the first node is still being processed.

6. A system for providing an indication to a user that processing of the expansion of a node is occurring, the system comprising:

a computing device having a processor and a memory;

a display device communicatively coupled to the computing device;

wherein icons are provided on the display device as part of a tree view to represent nodes, and once a user selects a node for expansion by the user selecting a plus-sign element that is associated with the icon for the node, the icon that is associated with the node is overlaid by a moving element wherein the moving element is moved at selected intervals which provides an indication to the user that processing of the expansion of the node is occurring.

7. The system of claim 6, further comprising a timer component.

8. The system of claim 7, wherein the moving element is moved at selected intervals as controlled by the timing component.

9. The system of claim 6, wherein when the node is expanded, representative icons of the sub-items for the node are displayed in the tree view below the icon that is associated with the node.

10. The system of claim 6, wherein the node is a folder, a computer, or a network domain.

11. The system of claim 6, wherein if a user selects a second node to be expanded while the expansion of the first node is still being processed, the icon that is associated with the second node is overlaid with a second moving element which provides an indication to the user that processing for expansion of the second node is occurring at the same time that the processing of the expansion of the first node is continuing.

12. In a computer system with a display, wherein icons on the display represent nodes that can be selected for expansion by a user, a method for indicating that processing of the expansion of a node is occurring, the method comprising:

providing an icon overlay over the icon of the node that has been selected by the user to be expanded, the user selecting a node to be expanded by selecting a plus-sign element that is associated with the icon of the node; and moving the icon overlay to different positions while processing is continuing to occur with regard to the expansion of the node, wherein the node is represented as part of a tree view on the display.

13. The method of claim 12, wherein the icon overlay is moved to the different positions at selected time intervals as controlled by a timer.

14. The method of claim 12, wherein the icon overlay is in the form of a magnifying glass.

15. The method of claim 14, wherein the magnifying glass icon overlay is moved between three positions as controlled by a timer.

16. The method of claim 12, wherein if a user selects a second node for expansion while the expansion of the first node is still being processed, then a second icon overlay is provided over an icon representing the second node.

17. A computer-readable storage medium having computer-executable components for providing an indication to a user that processing of an expansion of a first node is occurring, the computer-readable storage medium comprising:

an icon component for providing an icon, the icon representing the first node selected to be expanded by a user selecting a plus-sign element that is associated with the icon representing the first node; and an icon overlay component for providing an icon overlay moved between a plurality of positions at selected time intervals, the icon overlay over the icon representing the first node being provided while the expansion of the first node is being processed, wherein the first node is represented as part of a tree view on a display.

18. The computer-readable storage medium of claim 17, wherein the selected time intervals are determined according to a timer.

19. The computer-readable storage medium of claim 17, wherein if a user selects a second node to be expanded, the second node is also provided with an icon overlay over the icon representing the second node while the expansion of the first node is being processed.

20. The computer-readable storage medium of claim 19, wherein the second node is also represented as part of a tree view on the display.

21. In a computer system with a display, a method for providing an indication to a user that processing of an expansion of a node is occurring, the method comprising:

providing an icon overlay over an icon representing a node on the display to indicate that processing of the expansion of the node is occurring after a user has selected the node to be expanded by selecting a plus-sign element that is associated with the icon that represents the node wherein the node is represented as part of a tree view on the display and wherein the icon overlay is moved at selected time intervals; and removing the icon overlay once the processing is completed.

22. The method of claim 21, wherein the selected intervals are determined by a timer.

23. In a computer system, a method for providing an indication that processing of the expansion of a node is occurring, the method comprising:

providing a processing indicator on the display to indicate that processing of the expansion of a node is occurring, wherein the processing indicator comprises an icon overlay over an icon representing the node and wherein the expansion of the node occurs by a user selecting a plus-sign element that is associated with the icon that represents the node and wherein the node is represented as part of a tree view on the display; and after specified time intervals, moving the processing indicator to different positions to indicate that the processing is still occurring.

24. The method of claim 23, wherein the specified time intervals are determined according to a timer.

25. The method of claim 23, wherein the expansion of the node comprises displaying sub-items of the node in the tree view below the node.

26. The method of claim 23, wherein a second processing indicator is provided to indicate that the expansion of a second selected node is being processed.

27. A computer-readable storage medium having computer-executable components for providing an indication on a display that processing of the expansion of a node is occurring, the computer-readable storage medium comprising:

a processing indicator component for providing an indication on the display that the node is selected for expansion, wherein the processing indicator component comprises an icon overlay over an icon representing the node and wherein the node is represented as part of a tree view on the display;

a timer component; and wherein after a user selects a node to be expanded by selecting a plus-sign element that is associated with the icon that represents the node, the processing indicator component is moved at specified intervals as determined by the timer component, the movement of the processing indicator component providing an indication that the expansion of the node is being processed.

28. The computer-readable storage medium of claim 27, wherein the icon overlay is provided in the form of a magnifying glass.

29. The computer-readable storage medium of claim 27, wherein the expansion of the node comprises displaying sub-items of the node in the tree view.

30. The computer-readable storage medium of claim 29, wherein multiple nodes can be selected by a user to be expanded, and an icon overlay over an icon representing a node is provided for each of the selected nodes while each of their respective expansions are being processed.

31. The computer-readable storage medium of claim 30, wherein once the processing is completed for the expansion of a node, the sub-items of the node will be inserted into the tree view while the remaining nodes for which processing continues will continue to have their respective icon overlays.

* * * * *